(12) United States Patent
Bentley

(10) Patent No.: US 6,199,638 B1
(45) Date of Patent: Mar. 13, 2001

(54) TRACTOR IMPLEMENT HEIGHT HOLDING DEVICE

(76) Inventor: W. Wallace Bentley, Rte. 4, Box 4098, Monticello, FL (US) 32344

( * ) Notice: Subject to any disclaimer, the term of this patent is extended or adjusted under 35 U.S.C. 154(b) by 0 days.

(21) Appl. No.: 09/435,452

(22) Filed: Nov. 22, 1999

(51) Int. Cl.$^7$ .................................................. A01B 59/043
(52) U.S. Cl. ........................................................... 172/450
(58) Field of Search ............................ 56/14.9, 255, 503, 56/15.9, DIG. 14, DIG. 22; 172/439, 47, 450, 451, 786

(56) References Cited

U.S. PATENT DOCUMENTS

| | | | |
|---|---|---|---|
| 2,405,980 | * | 8/1946 | Sands et al. ........................ 280/33.44 |
| 3,797,582 | * | 3/1974 | Couch .................................. 172/451 |
| 4,154,455 | * | 5/1979 | Murphy ............................. 280/461 A |
| 4,258,765 | * | 3/1981 | Suomi ............................... 280/460 A |
| 4,329,103 | * | 5/1982 | Miller ................................. 37/117.5 |
| 5,178,511 | * | 1/1993 | Wedib ................................. 414/703 |

* cited by examiner

Primary Examiner—Robert E. Pezzuto
(74) Attorney, Agent, or Firm—John Wiley Horton

(57) ABSTRACT

A device for mechanically establishing the lowest point a three-point tractor hitch can sink to. The device comprises a modified chain which is attached at both ends to the towed implement near where the lift arms are attached to the implement. The chain's middle portion is draped over and adjustably attached to the top link, with the result that as the lift arms are lowered the chain draws taut and prevents the lift arms from sinking any lower.

4 Claims, 9 Drawing Sheets

TRACTOR IMPLEMENT HEIGHT HOLDING DEVICE

BACKGROUND

1. Field of Invention

This invention relates to the field of tractor hitches. More specifically, the invention comprises a device which adjustably sets the lowest point of travel for a conventional three-point agricultural hitch. The device is useful for maintaining an agricultural implement at the desired lowest point of travel without putting pressure on the hydraulic pump commonly used to adjust the height of such hitches.

2. Description of Prior Art

Three-point tractor hitches have been in common use for several decades. U.S. Pat. No. 4,071,105 to Von Allworden (1978) is a typical example. Similar configurations are disclosed in U.S. Pat. No. 2,685,160 to Kuhary et.al. (1954), U.S. Pat. No. 2,828,968 to Engler (1958), and U.S. Pat. No. 2,462,588 to Wondra (1947). The basic three-point configuration has changed little since its inception.

Turning to FIG. 1, the prior art three-point hitch will be explained. Tractor 10 has a pair of rocker arms 12, which rotate on a common shaft as hydraulic pressure is applied. When rocker arms 12 rotate upward, they pull lift links 16 with them. Lift links 16, in turn, pull lift arms 14 up with them. Lift arms 14 are pivotally connected to the underside of tractor 10 (illustrated in other views).

Many different agricultural implements may be attached to the hitching system. In the particular example illustrated in FIG. 1, mower 22 is attached. Mower 22 has A-frame 20 rigidly attached to its forward portion. A-frame 20 has two lift pins 24 rigidly attached thereto. Lift arms 14 have holes sized to slip over and engage lift pins 24.

Top link 18 is pivotally attached to tractor 10 as shown. The opposite end of top link 18 is pivotally attached to the upper portion of A-frame 24. The purpose of top link 18 is to keep mower 22 roughly level as it is raised and lowered (via the well-known operation of a 4-bar mechanism). Those skilled in the art will easily realize how the illustrated device functions. Rocker arms 12 are forcibly rotated by hydraulic power. If they are raised, then mower 22 is raised. Likewise, when they drop, mower 22 drops. Top link 18 is typically just a steel bar with an adjustment mechanism used to vary its length. The particular top link 18 illustrated in FIG. 1 is a new version, incorporating features of the present invention. However, it also provides the normal functions of a conventional top link.

Operator controls (not shown) are provided to allow the driver to adjust the height of the implement. It is very important to maintain a fixed height off the ground during many agricultural operations. The importance of this is obvious for mowing. It is also very important if the towed implement is a spraying rig—such as the type used for fertilizer and pesticides. The prior art operator controls often have an adjustable lower stop. The operator can set this stop to provide the correct height for the activity he is conducting. The height is hopefully maintained by hydraulic pressure holding rocker arms 12 in the set position. One must realize, however, that most agricultural implements are quite heavy.

In actual practice, this method of height maintenance has a serious shortcoming. The hydraulic pressure provided to position rocker arms 12 is supplied by a pump powered off the tractor's engine. The pressure is regulated by one or more control valves—usually of the proportional type. As the control valves wear with age, they often leak. This fact means that the height adjustment will creep downward. Over twenty or thirty minutes of operation, the operator will look back and realize that the implement has sunk six inches lower. He must then raise and lower the implement to reset the system. On older systems, he may have to reset the height every two or three minutes.

Even with new pumps and valves, height variations occur. On a cold morning, the hydraulic fluid circulating in the system starts with a much higher viscosity. As the fluid warms, its viscosity diminishes. Thus, an initial height adjustment will tend to sink as the system comes up to normal operating temperature. Significant differences in ambient temperature can cause the same phenomenon. A height setting made on a cold day will not bring the implement to the same position on a hot day.

The known devices for setting the height of an agricultural implement are therefore limited in that they:

1. Do not maintain a fixed position above the ground, instead letting the implement creep downward;
2. Do not maintain a fixed position as the hydraulic system heats up under cold conditions; and
3. Do not determine the same position under varying ambient conditions.

OBJECTS AND ADVANTAGES

Accordingly, several objects and advantages of the present invention are:

1. To maintain the implement in a fixed position above the ground;
2. To maintain said fixed position despite varying viscosity of the hydraulic fluid in the system; and
3. To maintain said fixed position despite varying ambient conditions.

DRAWING FIGURES

Figure 1:
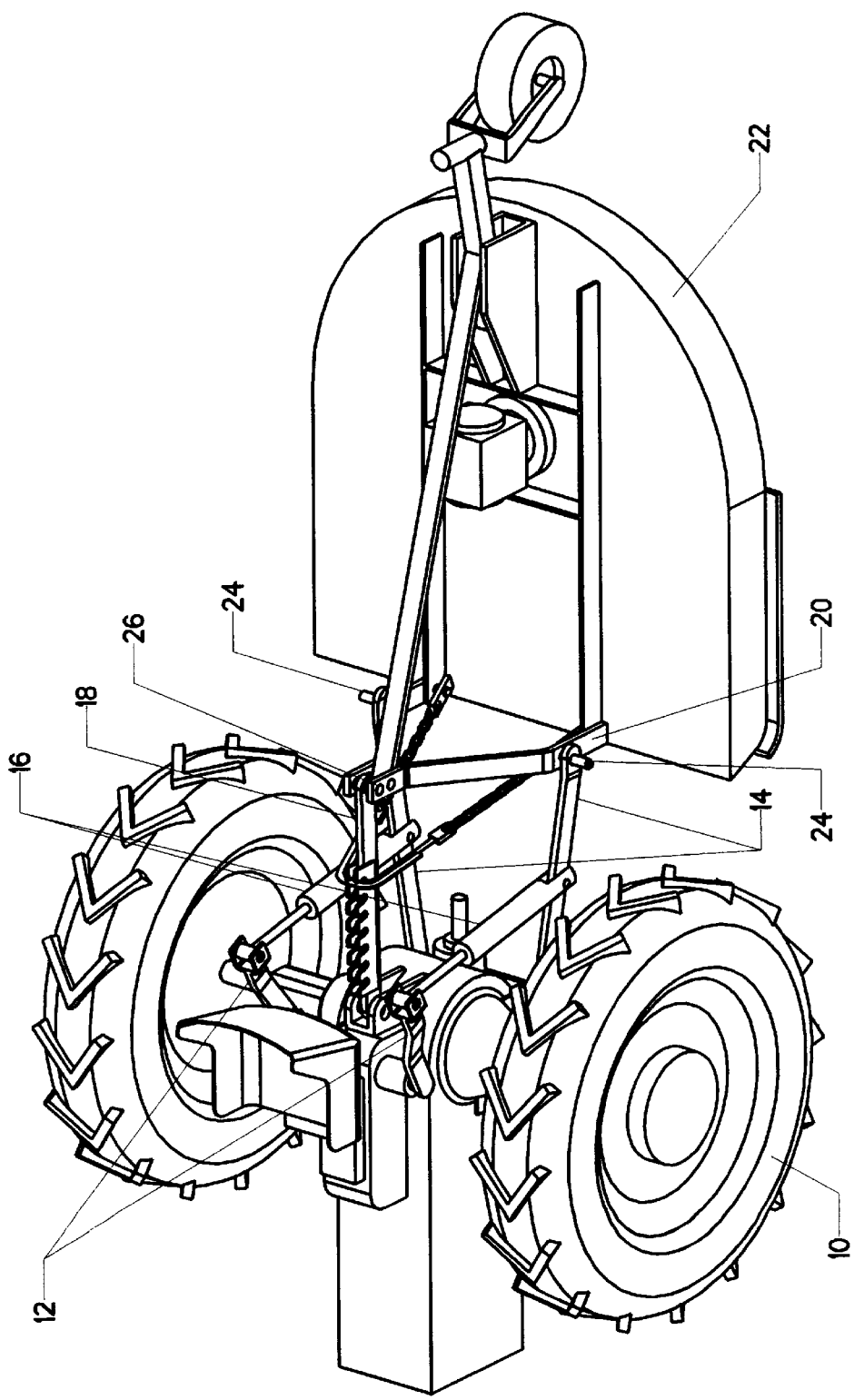
FIG. 1 is an isometric view, showing a tractor with an attached mower.

| Reference Numerals in Drawings | |
|---|---|
| 10 | tractor |
| 12 | rocker arm |
| 14 | lift arm |
| 16 | lift link |

| Reference Numerals in Drawings | |
|---|---|
| 18 | top link |
| 20 | A-frame |
| 22 | mower |
| 24 | lift pin |
| 26 | top pin |
| 28 | top link pivot |
| 30 | height maintaining link |
| 32 | lower attach point |
| 34 | adjustment bracket |
| 36 | adjustment notches |
| 38 | mounting pin hole |
| 40 | lower attach bracket |
| 42 | chain |
| 44 | top link strap |
| 46 | lift arm pivot |
| 48 | gearbox |
| 50 | PTO shaft |

DESCRIPTION OF THE INVENTION

Figure 2:
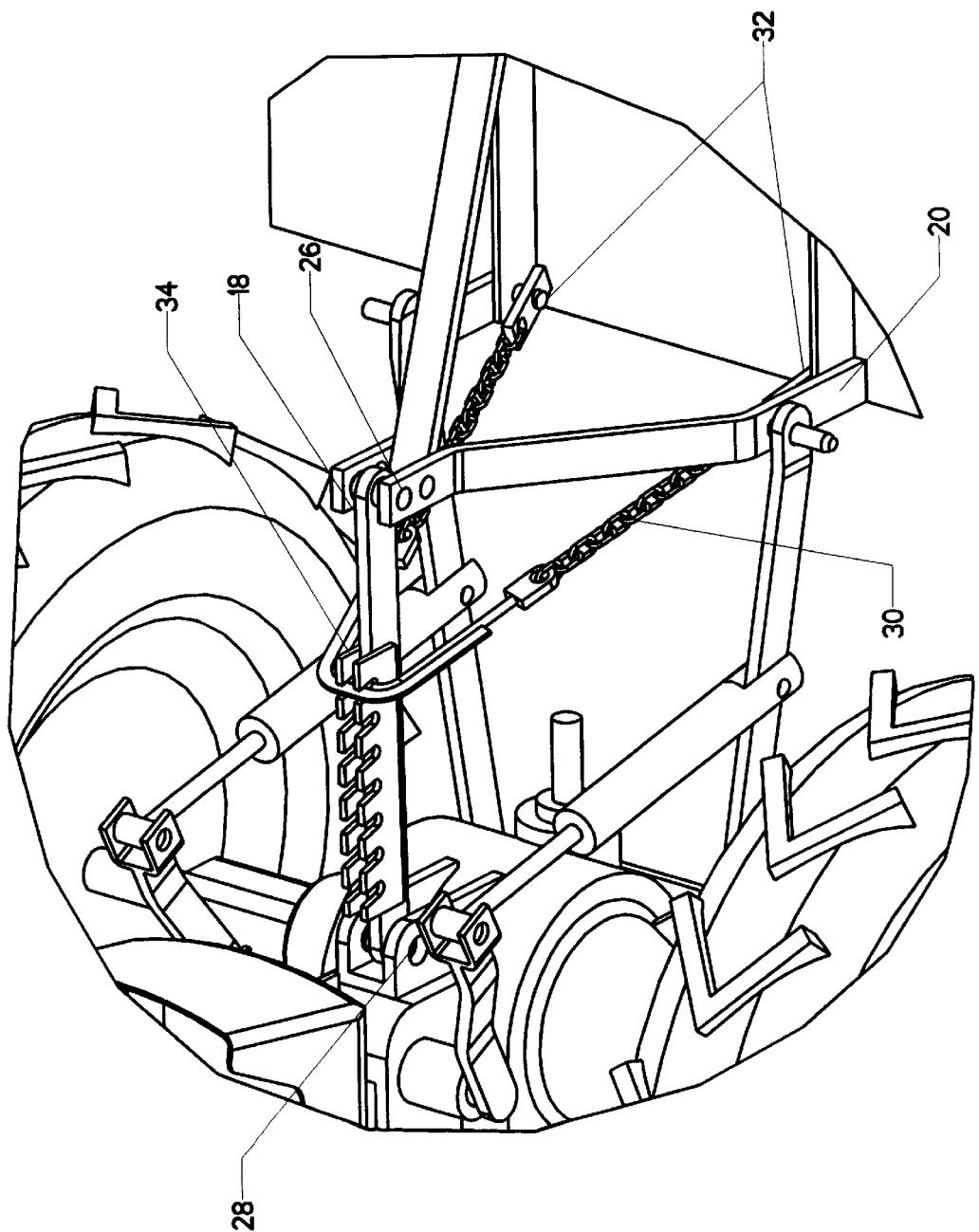
FIG. 2 is a close-up view of the three-point hitch shown in FIG. 1.

FIG. 1 illustrates tractor 10 with mower 22 attached to its three-point hitch, the operation of which has been explained previously. FIG. 2 provides a closer view of the novel aspects of the invention. Height maintaining link 30 is attached to mower 22 at two lower attach points 32. The middle portion of height maintaining link 30 passes over top link 18. Top link 18 is conventional, with the exception of adjustment bracket 34, which is provided to adjustably attach height maintaining link 30 to top link 18.

Figure 3:
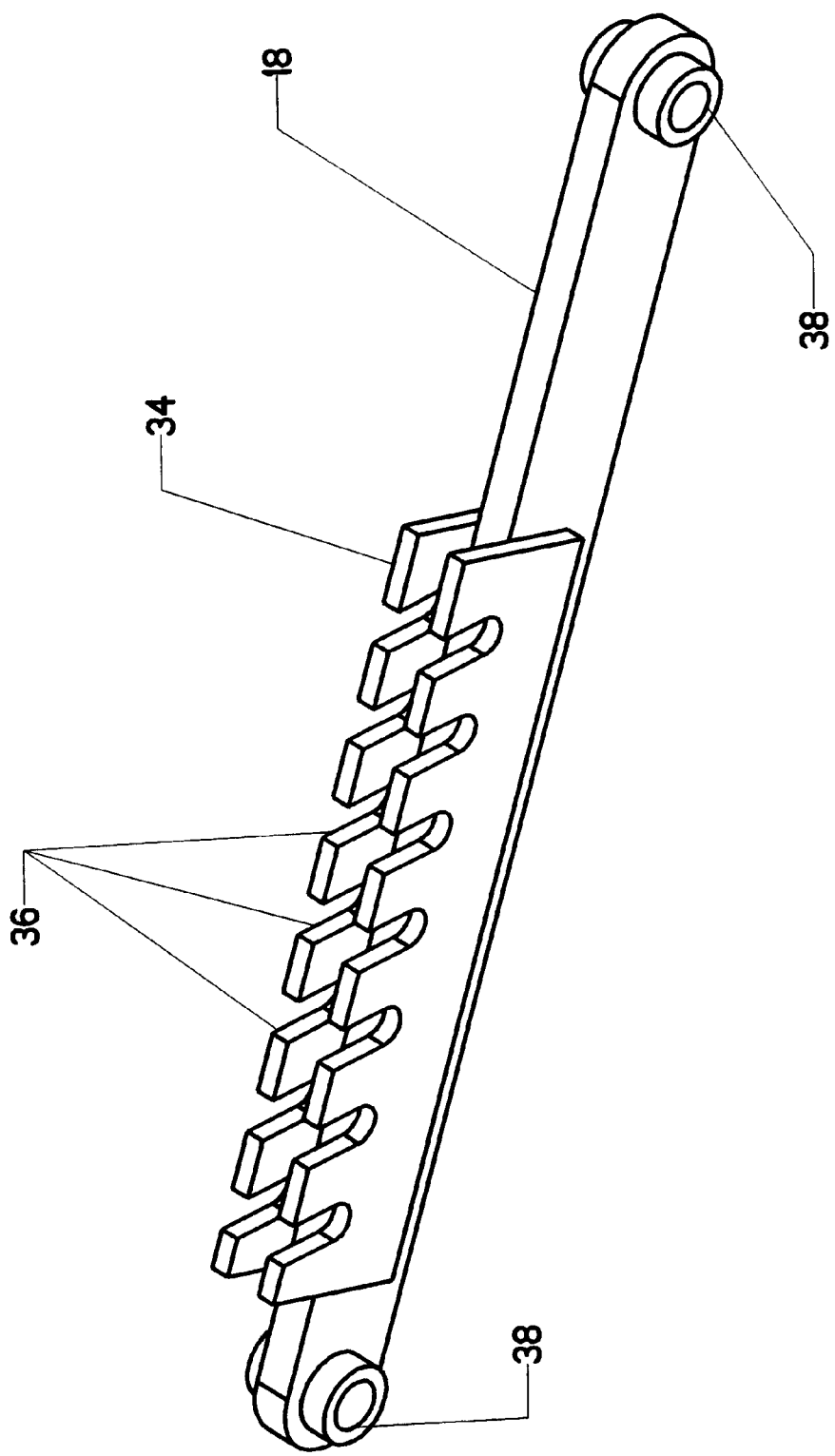
FIG. 3 is an isometric view of the novel top link used in the present invention.

FIG. 3 illustrates top link 18 in greater detail. Top link 18 has two mounting pin holes 38, which allow it to be attached to the tractor and the implement, as in the prior art. The forward portion of top link 18 is attached to tractor 10 at top link pivot 28 (shown in FIG. 2). The rear portion of top link 18 is attached to A-frame 20 at top pin 26 (also in FIG. 2). Adjustment bracket 34 is comprised of two steel plates welded to the sides of top link 18 as shown. Adjustment bracket 34 has a plurality of adjustment notches 36, which allow an operator to alter the point at which height maintaining link 30 is attached to top link 18.

Figure 4:
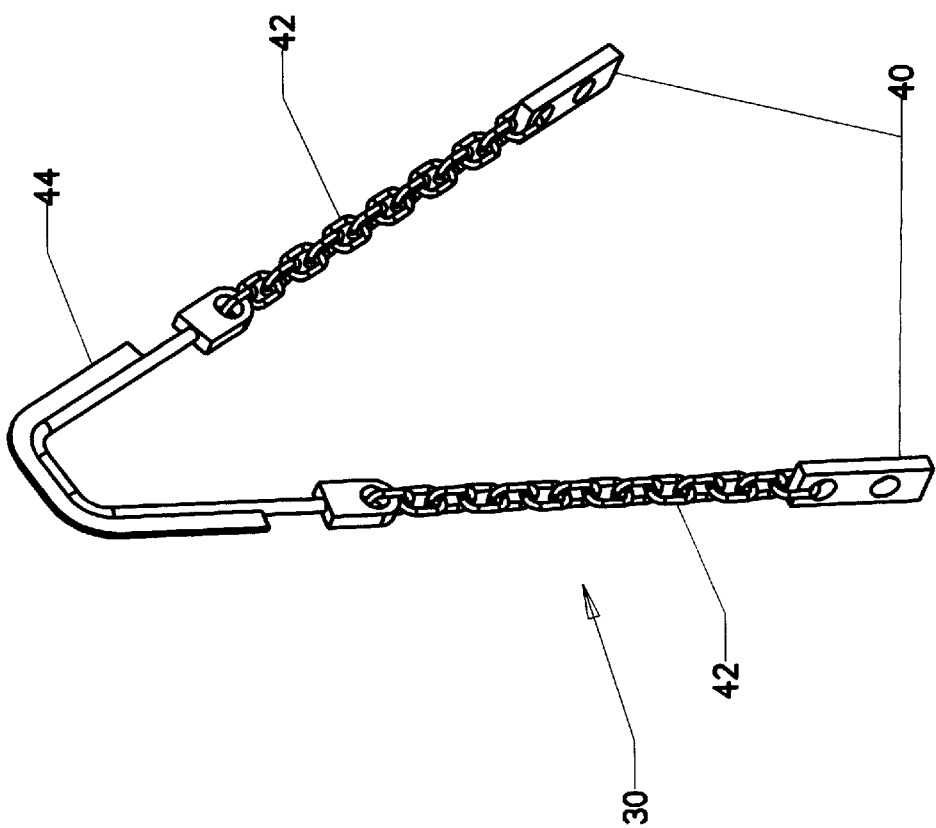
FIG. 4 is an isometric view of the height maintaining link used in the present invention.

FIG. 4 illustrates height maintaining link 30 in greater detail. Lower attach brackets 40 are provided to enable the user to easily attach height maintaining link 30 to lower attach points 32. Lower attach brackets 40 are provided with through holes so that conventional bolts may be used for attachment. Height maintaining link 30 also has top link strap 44, which is designed to engage adjustment notches 36 of adjustment bracket 34. In between lower attach brackets 40 and top link strap 44 are two lengths of chain 42. A sturdy cable could be substituted for chain 42. In fact, height maintaining link 30 could be made as a solid piece. However, the use of chain 42 has been found particularly effective, as will be explained in the following.

Figure 5:
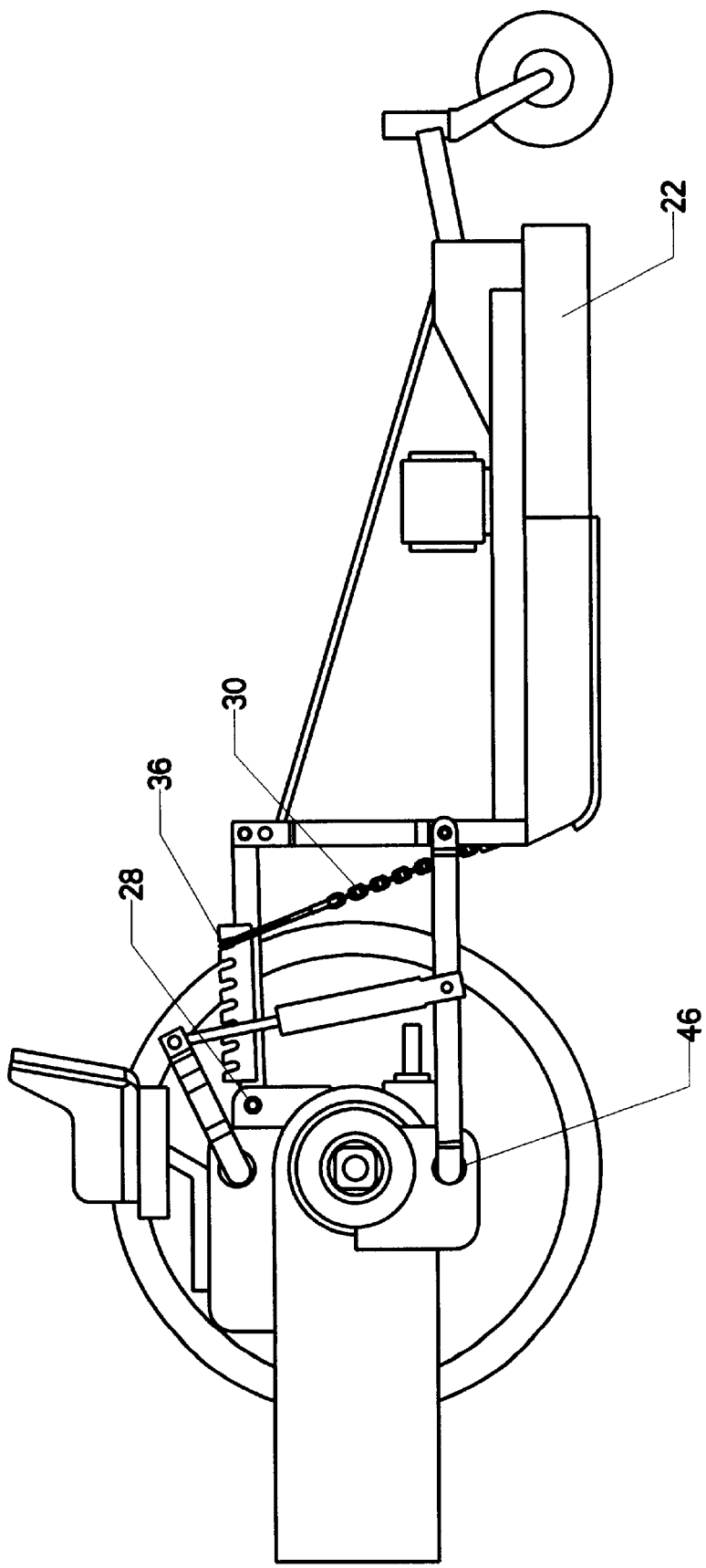
FIG. 5 is a side elevation view, showing the tractor and mower with the mower in a lowered position.
Figure 6:
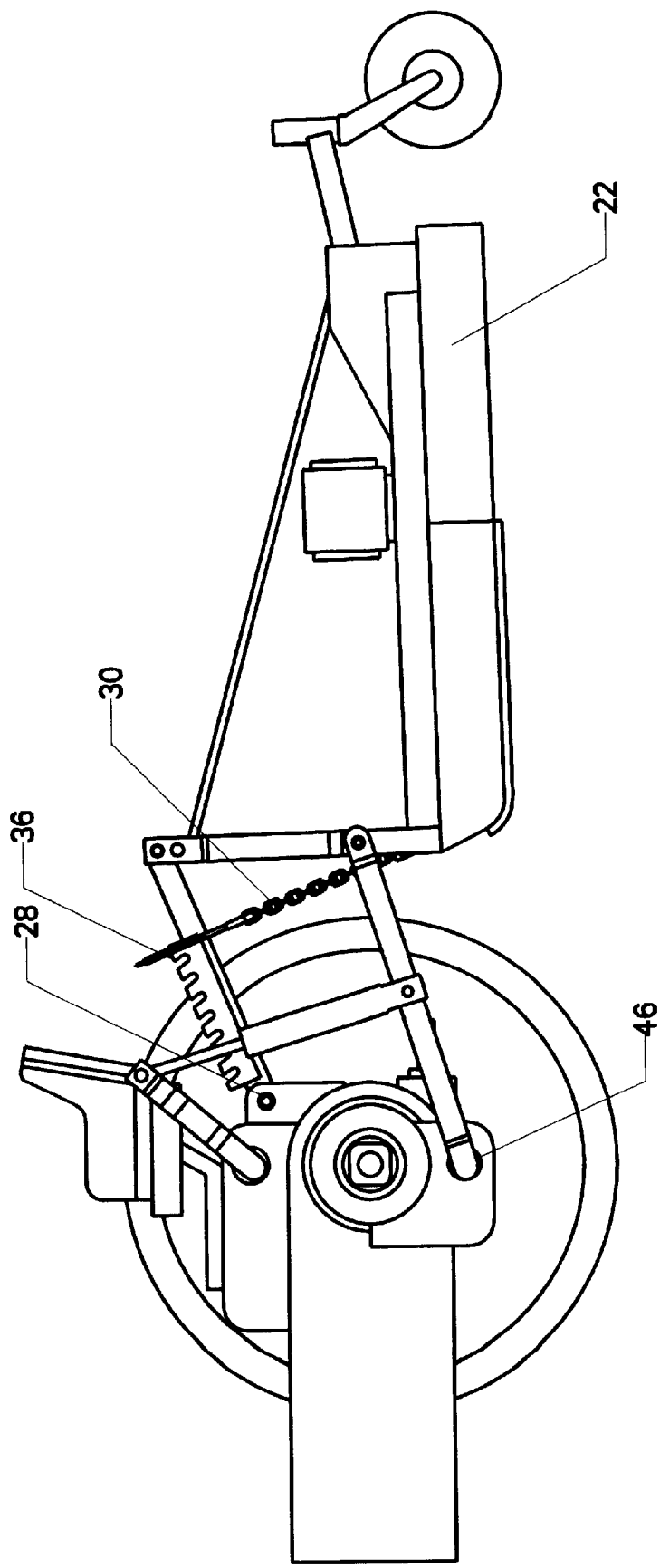
FIG. 6 is a side elevation view, showing the tractor and mower with the mower in a raised position.

FIGS. 5 and 6 illustrate the operation of the invention. The tires of tractor 10 are shown removed so that the reader may fully see the interaction of the present invention with the prior art three-point hitch. In FIG. 5, mower 22 is in a lowered position, appropriate for cutting operations. In FIG. 6, mower 22 has been raised by the previously explained operation of rocker arms 12. As also previously explained, the operation of top link 18 has tended to keep mower 22 roughly level.

Those skilled in the art will realize that tractor 10, lift arms 14, and top link 18 comprise a classic 4-bar linkage. By observing the positional differences between FIG. 5 and FIG. 6, the reader may easily comprehend the operation of height maintaining link 30. In FIG. 5, height maintaining link 30 is pulled into one of the adjustment notches 36 on top link 18. It is placed under tension and it prevents lift arms 14 from going any lower. In FIG. 6, lift arms 14 have been raised considerably. The reader will note that height maintaining link 30 is lifted well out of adjustment notches 36. In reality, of course, the chain portion of height maintaining link 30 will go slack and height maintaining link 30 will remain in its original adjustment notch 36, held in place by its own weight. However, by illustrating height maintaining link 30 as rigid, the reader will easily comprehend that lifting the implement, as shown in FIG. 6, removes tension from height maintaining link 30. Likewise, lowering the implement to the position shown in FIG. 5 places height maintaining link 30 in tension, thereby preventing the implement from going any lower.

Figure 7:
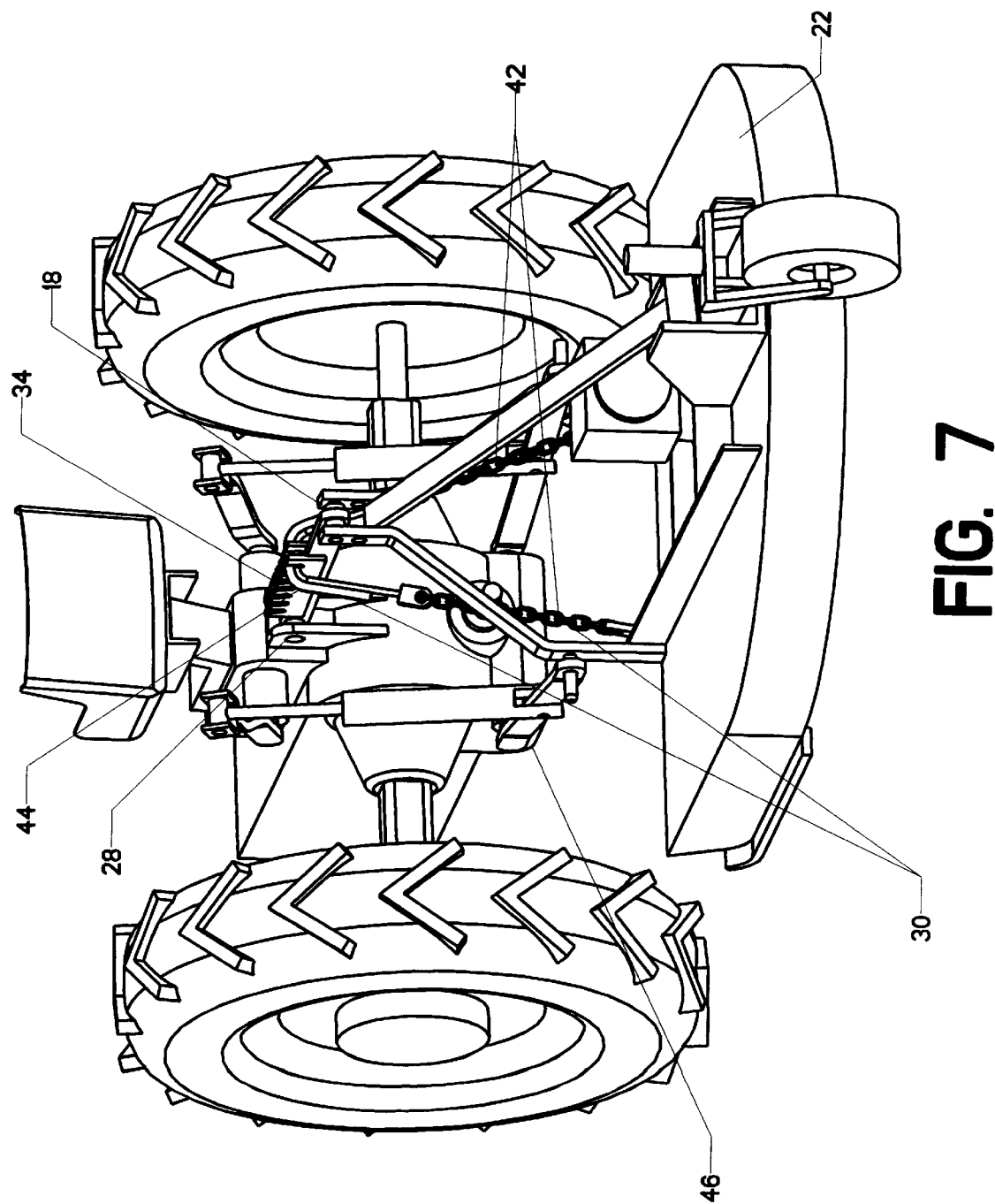
FIG. 7 is an isometric view showing the rear of the tractor with the mower in a lowered position.
Figure 8:
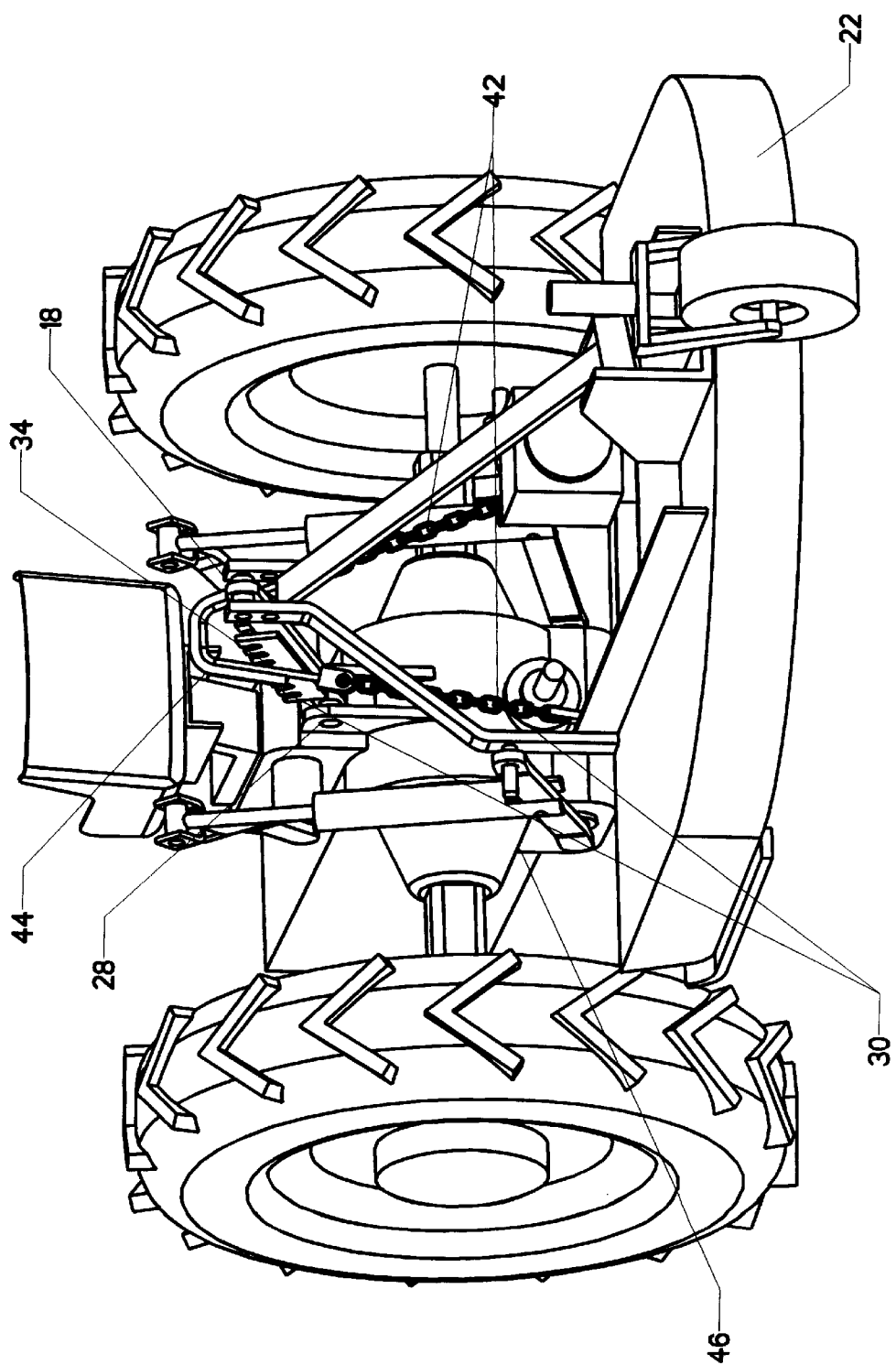
FIG. 8 is an isometric view showing the rear of the tractor with the mower in a raised position.

FIGS. 7 and 8 illustrate the identical positions of mower 22, seen from the rear. FIG. 7 represents the lowered position. The reader will observe that top link strap 44 is securely engaged within adjustment bracket 34 of top link 18. Chains 42 are under tension and mower 22 cannot go any lower. FIG. 8 represents the raised position. Height maintaining link 30 is once again illustrated as rigid, with the result that it appears to have lifted well out of adjustment bracket 34. The reader can visually appreciate the fact that it is no longer under tension and does not prevent the raising of the implement. In reality, top link strap 44 would remain engaged within adjustment bracket 34 by its own weight, and chains 42 would go slack.

Figure 9:
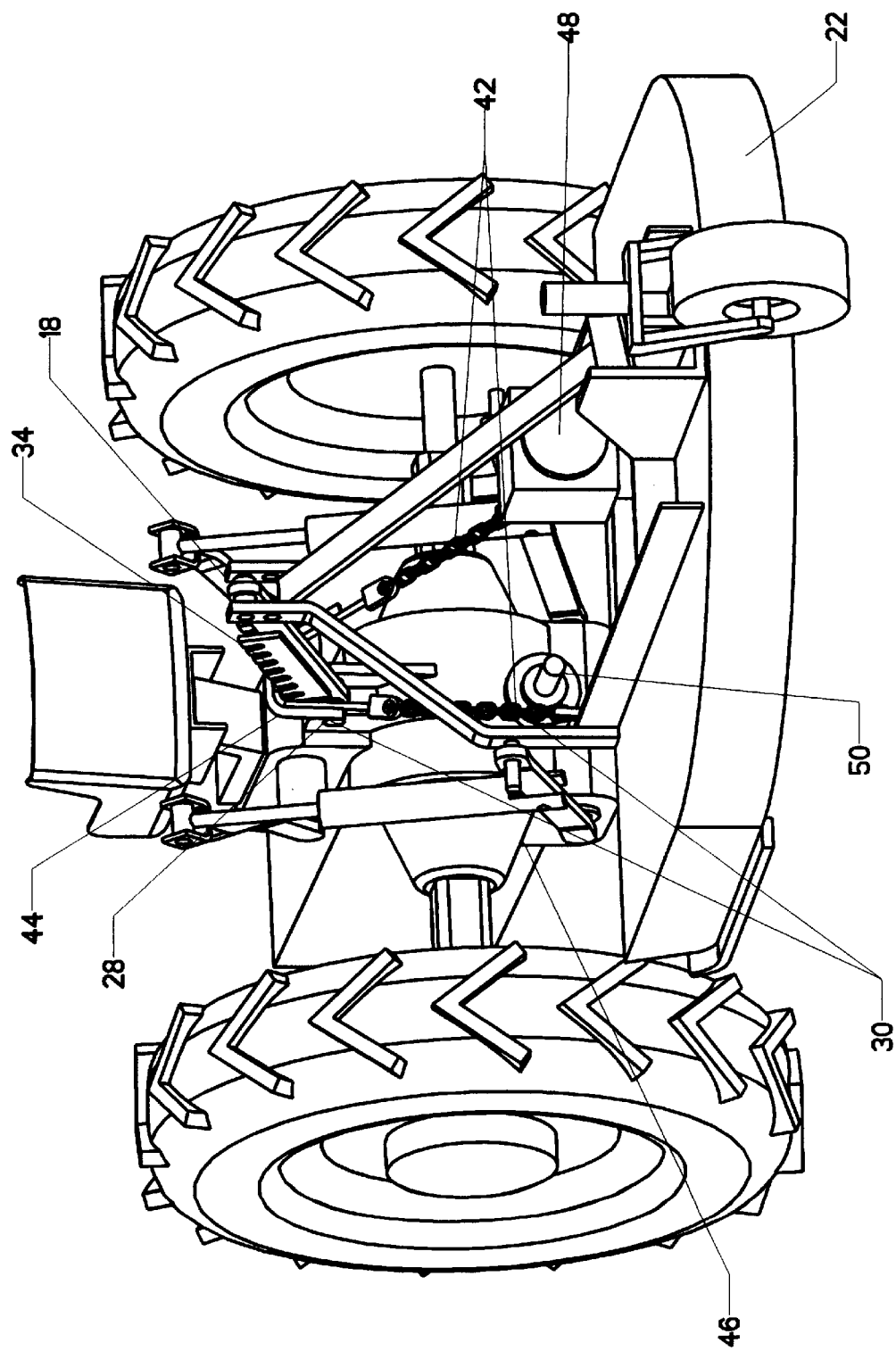
FIG. 9 is an isometric view showing the rear of the tractor with the chain assembly shifted to a new position.

FIG. 8 is also useful for illustrating how the operator can easily adjust the height set by height maintaining link 30. When mower 22 is raised as shown, the operator can reach back from the seated position, grasp top link strap 44, and lift it to the position shown. Turning now to FIG. 9, the operator can pull top link strap 44 forward and place it in a more forward adjustment notch 36. This alteration will result in a higher minimum height for mower 22. As shown in FIG. 9, mower 22 can only descend slightly before chains 42 come into tension and arrest its movement downward.

In the preferred embodiment, top link 18 and height maintaining link 30 are made of mild steel. It would be possible to make these items from many different materials. However, as strength is more important than weight savings in agricultural operations, steel is a good choice.

Those skilled in the art will realize that height maintaining link 30 could be made from a single length of chain. The chain could be attached on either end at lower attach points 32, and then passed over top link 18. The more complex version of height maintaining link 30, as presented, is a refinement of this basic concept. The incorporation of top link strap 44 makes the device function more smoothly.

Likewise, those skilled in the art will realize that a single length of chain could simply be attached to one point of the implement and one point of the top link. While this alternative embodiment is within the present invention, it has practical limitations that should be appreciated. Turning back to FIG. 9, this limitation will be explained. PTO shaft 50 is located on the rear of tractor 10. The purpose of this shaft is to provide rotary power to towed implements. Mower 22 receives this rotary power in gearbox 48. Ordinarily, there is a drive shaft ("PTO shaft") connecting PTO shaft 50 and gearbox 48. For purposes of visual simplicity, this drive shaft has not been shown in the figures. However, the reader may easily observe that the preferred embodiment of height maintaining link 30 avoids interfering with this drive shaft. A single length of chain would have difficulty achieving the same result.

SUMMARY, RAMIFICATIONS, AND SCOPE

Accordingly, the reader will appreciate that the proposed invention maintains the height of a towed implement on a conventional three-point hitch. The invention has further advantages in that it maintains the fixed height despite varying viscosity of the hydraulic fluid in the system, and it maintains the fixed height despite varying ambient conditions.

Although the preceding description contains significant detail, it should not be construed as limiting the scope of the invention but rather as providing illustrations of the preferred embodiment of the invention. For example, many different types of tensile members could be substituted in place of chains 42, many different adjustment methods could be provided on top link 18, etc. Thus, the scope of the invention should be fixed by the following claims, rather than by the examples given.

Having described my invention, I claim:

1. A device for mechanically fixing the minimum height off the ground of an agricultural implement attached to a pair of lift arms and a top link of a tractor, comprising:

a height maintaining link, being substantially inelastic when placed under tension, having a first end and a second end, with said first end being attached to said implement in close proximity to said lift arms, and with said second end being attached to said top link, so that as said lift arms are lowered said height maintaining link comes under tension and prevents said lift arms from descending further.

2. A device as recited in claim 1, wherein said height maintaining link comprises a chain.

3. A device as recited in claim 1, wherein said top link includes an adjustment bracket, having a plurality of adjustment notches, sized and shaped to engage said height maintaining link, so that the point at which said second end of said height maintaining link attaches to said top link may be easily adjusted.

4. A device as recited in claim 1, wherein said height maintaining link comprises:

a. a first lower bracket, including attachment means for attaching said first lower bracket to said implement proximate to the point where said lift arms are attached to said implement;

b. a first chain, having a first end and a second end, with said first end being attached to said first lower bracket;

c. a top link strap, having a first end, a middle portion, and a second end, with said first end being attached to said second end of said first chain;

d. a second chain, having a first end and a second end, with said first end being attached to said second end of said top link strap; and e. a second lower bracket, including attachment means for attaching said second lower bracket to said implement proximate to the point where said lift arms are attached to said implement, with said second lower bracket being attached to said second end of said second chain.

* * * * *